US006208873B1

United States Patent
Black et al.

(10) Patent No.: US 6,208,873 B1
(45) Date of Patent: Mar. 27, 2001

(54) METHOD AND APPARATUS FOR TRANSMITTING REVERSE LINK POWER CONTROL SIGNALS BASED ON THE PROBABILITY THAT THE POWER CONTROL COMMAND IS IN ERROR

(75) Inventors: Peter J. Black, La Jolla; Eduardo A. S. Esteves, Del Mar, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/198,320

(22) Filed: Nov. 23, 1998

(51) Int. Cl.⁷ ...................................................... H04Q 7/20
(52) U.S. Cl. ........................... 455/522; 455/69; 455/67.1; 455/67.3; 455/126; 455/127
(58) Field of Search .................................. 455/67.1, 67.3, 455/67.6, 69, 70, 522, 574, 126, 127; 375/130; 370/342, 320, 335

(56) References Cited

U.S. PATENT DOCUMENTS

| | | | |
|---|---|---|---|
| 4,901,307 | 2/1990 | Gilhousen et al. | 370/18 |
| 5,056,109 | 10/1991 | Gilhousen et al. | 375/1 |
| 5,101,501 | 3/1992 | Gilhousen et al. | 455/33 |
| 5,107,225 | * 4/1992 | Wheatley, III et al. | 330/279 |
| 5,265,119 | 11/1993 | Gilhousen et al. | 375/1 |
| 5,727,031 | 3/1998 | Solve et al. . | |
| 5,887,245 | * 3/1999 | Lindroth et al. | 455/69 |
| 6,002,942 | * 12/1999 | Park | 455/522 |
| 6,070,086 | * 5/2000 | Dobrica | 455/522 |
| 6,118,988 | * 9/2000 | Choi | 455/115 |

FOREIGN PATENT DOCUMENTS 08663619    2/1998  (EP) .

* cited by examiner

Primary Examiner—Nay Maung
Assistant Examiner—Temica M. Davis
(74) Attorney, Agent, or Firm—Philip R. Wadsworth; Kyong H. Macek (57) ABSTRACT

A method and apparatus for controlling the transmit power of a plurality of mobile radio units transmitting to a base station in a mobile radio telephone system. For each of the mobile units in the system, a signal strength estimate is measured at the base station based on reverse link signals sent from the mobile units and received at the base station, wherein each signal strength estimate is associated with one of the mobile units. The signal strength estimate associated with each mobile unit is compared to a threshold. Next, for each mobile unit in the plurality of mobile units, if the signal strength estimate associated with the mobile unit is greater than the threshold, then a power control bit having a first value is assigned to the mobile unit; conversely, if the signal strength estimate associated with the mobile unit is less than the threshold, then a power control bit having a second value is assigned to the mobile unit. A variable gain that is a function of the difference between the signal strength estimate associated with the mobile unit and the threshold is next applied to each power control bit. The variable gain applied to each power control bit increases as the magnitude of the difference between the signal strength estimate associated with the mobile unit and the threshold increases. Each gain-adjusted power control bit is then transmitted to the mobile units.

44 Claims, 9 Drawing Sheets

METHOD AND APPARATUS FOR TRANSMITTING REVERSE LINK POWER CONTROL SIGNALS BASED ON THE PROBABILITY THAT THE POWER CONTROL COMMAND IS IN ERROR

BACKGROUND OF THE INVENTION

I. Field of the Invention

The present invention relates generally to mobile radio communication systems. More specifically, the present invention relates to code division multiple access (CDMA) mobile radio communication systems that control the output transmit power of information signals sent between mobile units and base stations.

II. Description of the Related Art

In CDMA radio communication systems operating in accordance with the TIA/EIA-95 standard (the IS-95 standard), the base station transmits a power control stream at 800 bps to the mobile station on the Traffic Channel. Binary phase shift keying (BPSK) modulation is used for the power control bit stream. One phase of the modulated power control signal indicates that the mobile station is to increase transmit power. Another phase of the modulated power control signal indicates that the mobile station is to decrease transmit power. The base station determines whether to have the mobile station increase or decrease its transmit power by comparing a measured value (Z) that is related to the actual received signal to noise ratio $(E_c/N_t)_{actual}$ at the base station to a threshold which corresponds to a desired signal to noise ratio $(E_c/N_t)_{desired}$ at the base station. If the value (Z) is less than the threshold, then the base station sends a command to the mobile station instructing it to increase its transmit power. If this value (Z) is greater than the threshold, then the base station sends a command to the mobile station instructing it to decrease its transmit power. This power control system is described more fully in IS-95 and in U.S. Pat. Nos. 5,056,109 and 5,265,119, both of which are entitled "Method and Apparatus for Controlling Transmission Power In A CDMA Cellular Telephone System" and assigned to the assignee of the present invention and incorporated by reference herein. Further details of an exemplary CDMA system can be found in U.S. Pat. No. 4,901,307 entitled "Spread Spectrum Multiple Access Communication System Using Satellite Or Terrestrial Repeaters," which is assigned to the assignee of the present invention and incorporated herein in its entirety by reference. The IS-95 standard is set forth in the TIA/EIA Interim Standard entitled "Mobile Station—Base Station Compatibility Standard for Dual-Mode Wideband Spread Spectrum Cellular System,"TIA/EIA/IS-95, dated July, 1993, the contents of which are also incorporated herein by reference.

Figure 1:
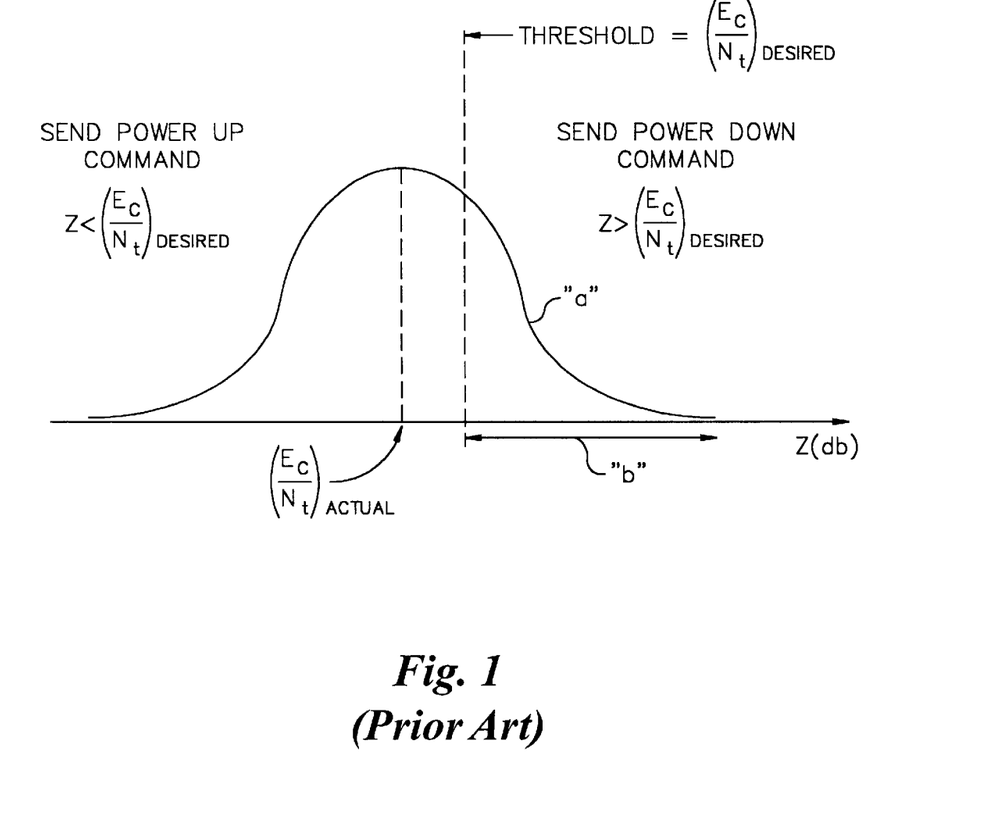
FIG. 1 depicts the operation of a system for determining the values of power control bits sent to mobile units from a CDMA base station, in accordance with the prior art.

As mentioned above, in CDMA systems that comply with the IS-95 standard, the base station compares the measured value (Z) which is related to the actual received signal to noise ratio $(E_c/N_t)_{actual}$ at the base station to the threshold $(E_c/N_t)_{desired}$ in order to determine whether to send a power up or a power down command to the mobile station. Although the value of Z is related to the actual received signal to noise ratio $(E_c/N_t)_{actual}$, Z is in fact randomly distributed around the value $(E_c/N_t)_{actual}$ as a result of the random noise component in the received signal at the base station. As a result of this, the measured value of Z at any given time will likely be different from the actual received signal to noise ratio $(E_c/N_t)_{actual}$. An example of this is shown in FIG. 1, where curve "a" shows the random distribution of Z around the $(E_c/N_t)_{actual}$ value. (The distribution is assumed to be Guassian for purposes of discussion). Unfortunately, as shown in FIG. 1, when the actual signal to noise ratio $(E_c/N_t)_{actual}$ is sufficiently close to the desired signal to noise ratio $(E_c/N_t)_{desired}$ threshold, a portion of the distribution (identified as region "b" in FIG. 1) for Z will lie on the opposite side of the threshold from the $(E_c/N_t)_{actual}$ value. Significantly, when the Z lies in this region "b" on FIG. 1, the base station will send an erroneous power down command to the mobile station. The power down command will be erroneous, because the actual received signal to noise ratio is on the side of the threshold $(E_c/N_t)_{desired}$ associated with a power up command, rather than a power down command. In view of the example shown in FIG. 1, it is clear that, as a general rule, the likelihood that the power control command from the base station will represent an erroneous value will increase as the actual received signal to noise ratio $(E_c/N_t)_{actual}$ approaches the desired signal to noise ratio $(E_c/N_t)_{desired}$. The transmission of such erroneous power control commands is undesirable because misleading information is being sent to the mobile station (e.g., the mobile station is being commanded to power down when it should be increasing its power). In addition, given that such power control commands are erroneous, the allocation of transmit power on the forward link to support transmission of these commands represents a waste of forward link transmit power which is limited in CDMA systems. It would therefore be desirable if the transmission of such erroneous power control information could be minimized or eliminated.

Another aspect of the reverse link power control system used in IS95 and described above results from the fact that a power control bit (indicating whether the mobile station should either increase or decrease its transmit power) is transmitted to each and every mobile station. It would be desirable, especially in cases where the base station determined that the actual received signal to noise ratio $(E_c/N_t)_{actual}$ from a particular mobile station was within a range of the desired signal to noise ratio $(E_c/N_t)_{desired}$ such that there was a significant probability that an erroneous power control command would be sent from the base station, for the base station to be able to reduce the power used for transmitting the power control information to the particular mobile station, thereby conserving transmit power at the base station and either allowing more transmit power to be allocated to information that is being transmitted to other mobile stations or allowing more users to be supported by the base station.

A still further aspect of the reverse link power control system used in IS95 that is relevant to an understanding of the disclosed method and apparatus is the performance of the mobile station when the mobile station receives a weak (e.g., low signal to noise ratio) power control command from a base station. In such cases, due to the weakness of the signal, the mobile station will have difficulty determining whether the base station sent a power up or alternatively a power down command to the mobile station. In these cases, the mobile station will attempt to decode the power control command, but will often arrive at an erroneous result due to the weakness of the signal. In other words, after attempting to decode the weak power control command, the mobile station will for example decide that the base station had sent a power up command to the mobile station when in fact the base station had sent a power down command to the mobile station. As a general rule, it is believed that the weaker the power control command from the base station, the more likely it is that the mobile station will erroneously interpret the power control command. Moreover, it is believed that, when the power control command sent from the base station becomes sufficiently weak, the error rate of the mobile station in determining whether the power control command from the base station was a power up command or a power down command, may approach 50%.

These problems and deficiencies in the reverse link power control system of IS-95 are recognized and overcome by the improved system for conserving transmit power disclosed below.

SUMMARY OF THE INVENTION

A method and apparatus for controlling the transmit power of a first communication station that is transmitting an information signal to a second communication station is disclosed below. In this embodiment, the transmit power required to transmit the information signal is conserved by adjusting the transmission power of the information signal based on the degree to which the system estimates that the information signal may be carrying erroneous data. More specifically, the disclosed method and apparatus allocates more transmit power to an information signal which is believed to carry accurate or correct data, and the disclosed method and apparatus allocates less transmit power to an information signal which is believed to have a significant probability of carrying erroneous data or commands. In this general embodiment, prior to transmission of the information signal from the first site to the second site, the system assesses the probability that the information signal contains erroneous information. Next, a variable gain is applied to the information signal in accordance with the probability that the information signal contains erroneous information, wherein the variable gain applied to the information signal decreases as the probability that the information signal contains erroneous information increases. The gain adjusted information signal is then transmitted from the first station to the second station.

In a more specific embodiment, the disclosed method and apparatus controls the transmit power of a plurality of mobile radio units transmitting to a base station in a mobile radio communication system. In this embodiment, the disclosed method and apparatus conserves the transmit power required to transmit power control bits to the mobile units by adjusting the transmission power of each power control bit based on the degree to which the system estimates that the power control bit may represent an erroneous value. More particularly, the disclosed method and apparatus allocates more transmit power to those power control bits which are believed to represent an accurate power control command, and allocates less transmit power to those power control bits which have a significant probability of representing erroneous commands. For each of the mobile units in the system, a signal strength estimate is measured at the base station based on reverse link signals sent from the mobile units and received at the base station, wherein each signal strength estimate is associated with one of the mobile units. The signal strength estimate associated with each mobile unit is then compared to a threshold which, in the preferred embodiment, corresponds to a desired signal to noise ratio at the base station. Next, for each mobile unit in the plurality of mobile units, if the signal strength estimate associated with the mobile unit is greater than the threshold, then a power control bit having a first value is assigned to the mobile unit; conversely, if the signal strength estimate associated with the mobile unit is less than the threshold, then a power control bit having a second value is assigned to the mobile unit. A variable gain that is a function of the difference between the signal strength estimate associated with the mobile unit and the threshold is next applied to each power control bit. The variable gain applied to each power control bit increases as the magnitude of the difference between the signal strength estimate associated with the mobile unit and the threshold increases. Each power control bit is then transmitted to the mobile units. In a specific implementation of this embodiment, when a mobile station has an associated signal strength that is within a predetermined range of the threshold, a zero gain (corresponding to a power control bit erasure) may be applied to the power control bit associated with such mobile unit.

In accordance with a further aspect, the disclosed method and apparatus may be used to simultaneously transmit from a base station the power control bits associated with a plurality of mobile units using spread spectrum modulation. In this embodiment, a plurality of power control channels are provided for transmitting power control information from the base station to the mobile units, wherein each of the power control channels is assigned to one of the mobile units and uses one of a plurality of different orthogonal codes for transmitting power control information from the base station to a mobile unit. Each power control bit is simultaneously transmitted to the mobile units during a time interval such that each power control bit is transmitted to the mobile units on a different one of the plurality of power control channels.

In accordance with a still further aspect, the disclosed method and apparatus may be combined with either a binary or a ternary system at the mobile units for interpreting power control information signals sent from a base station. In these embodiments, a received power control signal value is determined at a mobile station by demodulating transmissions on the power control channel associated with the mobile station. The received power control signal value is compared to second and third thresholds at the mobile station. If the received power control signal value is greater than the second threshold, then the transmit power of signals sent from the mobile unit to the base station on the reverse link is increased and, if the received power control signal value is less than the third threshold, then the transmit power of signals sent from the mobile unit to the base station on the reverse link is decreased. The second threshold may be set equal to or greater than the third threshold. In the embodiment where the second threshold is set to be greater than the third threshold, if the received power control signal value is less than the second threshold and greater than the third threshold, then the transmit power of signals sent from the mobile unit to the base station on the reverse link is held constant.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 2:
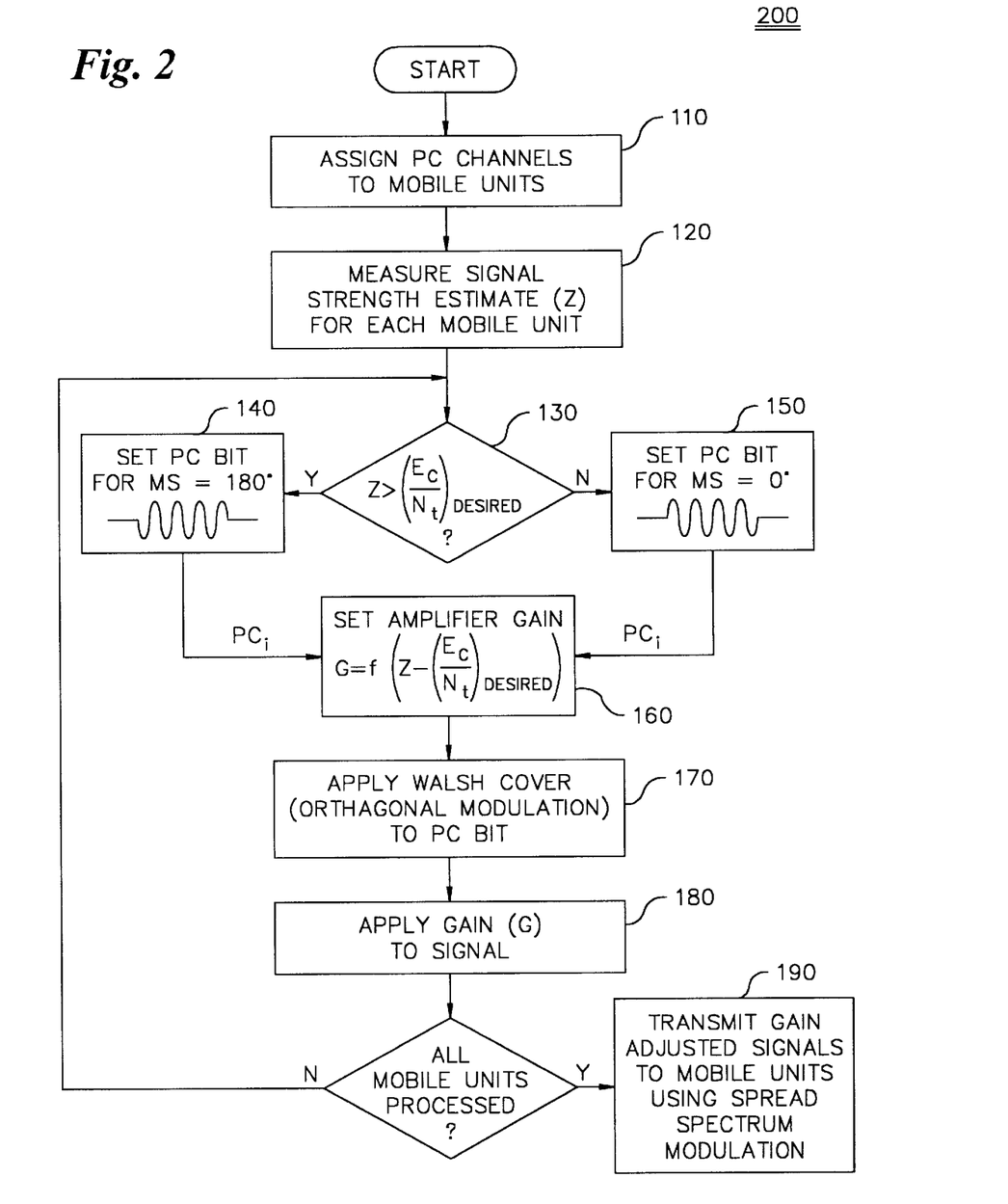
FIG. 2 is a flow diagram showing a method for determining and simultaneously transmitting power control bits to mobile units from a CDMA base station on a plurality of power control channels using spread spectrum modulation, in accordance with a preferred embodiment of the disclosed method and apparatus.
Figure 3:
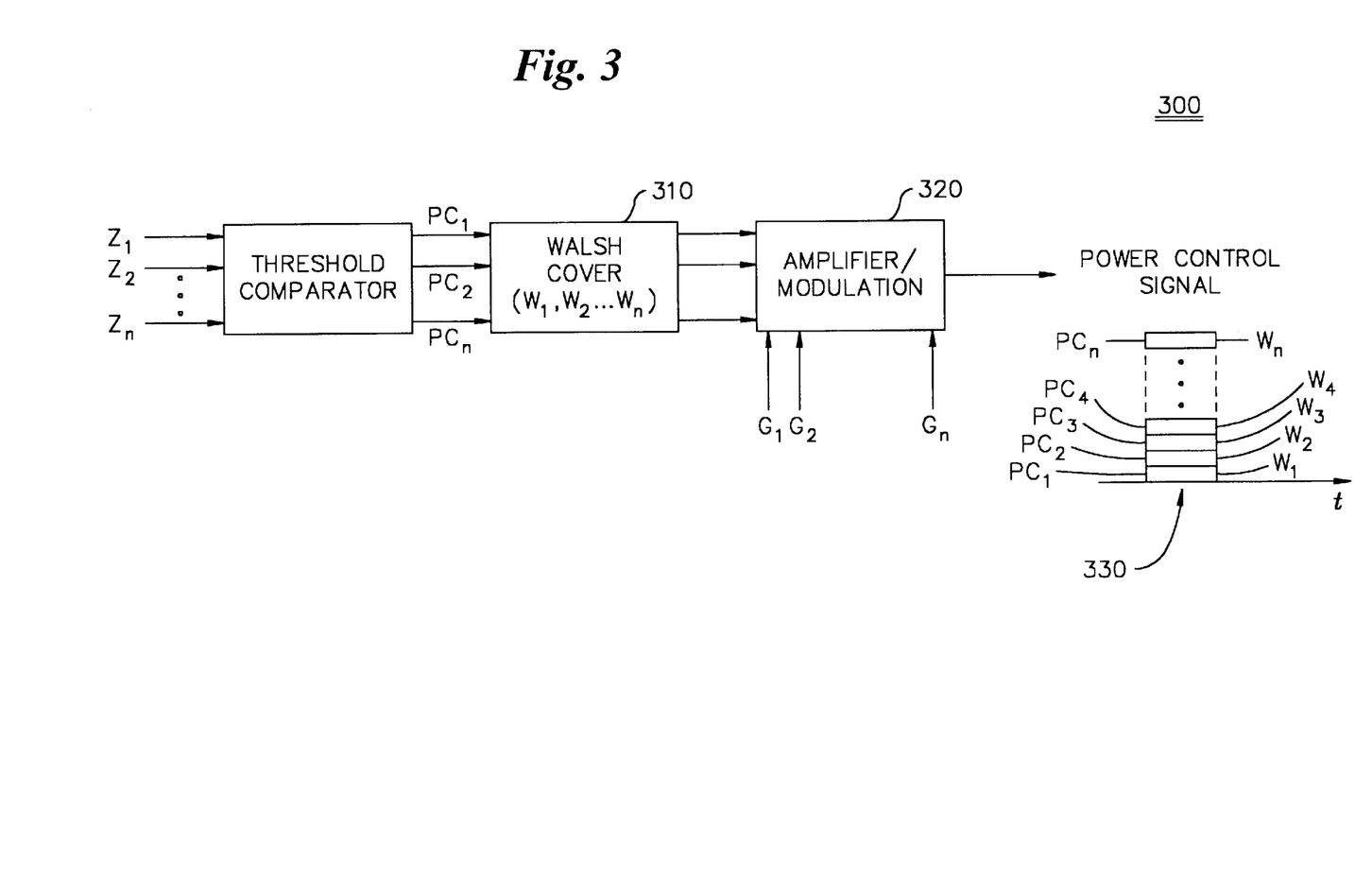
FIG. 3 is a block diagram showing a system for implementing the method shown in FIG. 2.

Referring now to FIGS. 2 and 3, there are shown flow and block diagrams, respectively, of a method 200 and system 300 for determining and simultaneously transmitting from a CDMA base station power control bits to mobile units on a plurality of power control channels using spread spectrum modulation, in accordance with a preferred embodiment of the disclosed method and apparatus. In step 110, a plurality of power control channels are allocated (either at the base station or a mobile switching station) for transmitting power control information from the base station to the mobile units being serviced by the base station. Each of the power control channels is assigned to a different one of the plurality of mobile units being serviced by the base station and uses one of a plurality of different orthogonal codes for transmitting power control information bits from the base station to a mobile unit using spread spectrum modulation.

In step 120, a signal strength estimate (e.g., the value (Z) described above and shown in FIG. 1) is measured at the base station for each of the mobile units being serviced by the base station. For each mobile unit, the signal strength estimate associated with the mobile unit is measured at the base station based on reverse link signals sent from the mobile unit and received at the base station. The signal strength estimate preferably corresponds to the ratio of the desired signal energy per chip ($E_c$) to the undesired noise energy per chip ($N_t$), where the ratio is denoted as $E_c/N_t$. In a preferred embodiment, the signal strength estimate is measured for each particular mobile station ($MS_i$, where i=1 to the number of mobile stations serviced by the base station) by monitoring at the base station a pilot signal sent from the particular mobile station, and then detecting the signal strength value ($Z_i$) associated with that pilot signal.

In step 130, the signal strength estimate associated with each mobile unit is compared to a threshold which, in the preferred embodiment, corresponds to the $(E_c/N_t)_{desired}$ value described above in connection with FIG. 1. As explained more fully below, BPSK modulation is then used to encode the power control bits in accordance with each signal strength estimate. Thus, in step 140, if the signal strength estimate associated with a particular mobile unit is greater than the threshold, then a power control bit having a first value (i.e., $PC_i=180°$) is assigned to the mobile unit. In this embodiment, a power control bit having the first value (i.e., $PC_i=180°$) corresponds to a command to a mobile unit that the mobile unit should decrease its output transmit power by a predetermined amount such as 1 db during its next transmit interval. If the signal strength estimate associated with the particular mobile unit was not greater than the threshold, then in step 150, a power control bit having a second value (i.e., PC=0°) is assigned to the mobile unit. In this embodiment, a power control bit having the second value (i.e., $PC_i=0°$) corresponds to a command to a mobile unit that the mobile unit should increase its output transmit power by a predetermined amount such as 1 db during the next transmit interval.

In step 160, the transmission power of each power control bit is gain adjusted based on the degree to which the power control bit may represent an erroneous value. The gain adjustment applied in this step functions to allocate more transmit power to those power control bits which are believed to represent an accurate power control command, and less transmit power to those power control bits which have a significant probability of representing erroneous commands. More particularly, in step 160, a variable gain value ($G_i$) is determined for each mobile unit. The variable gain value ($G_i$) is a function of the magnitude of the difference between the signal strength estimate (Z) associated with the mobile unit and the threshold ($E_c/N_t)_{desired}$, and the variable gain value ($G_i$) increases as the magnitude of the difference between the signal strength estimate associated with the mobile unit and the threshold increases. Since, as described above in connection with FIG. 1, the difference between the signal strength estimate (Z) associated with the mobile unit and the threshold $(E_c/N_t)_{desired}$ represents an estimate of how accurately the base station will chose the next power control command, the variable gain value ($G_i$) decreases as the likelihood that the base station has selected an erroneous power control command increases.

Figure 4:
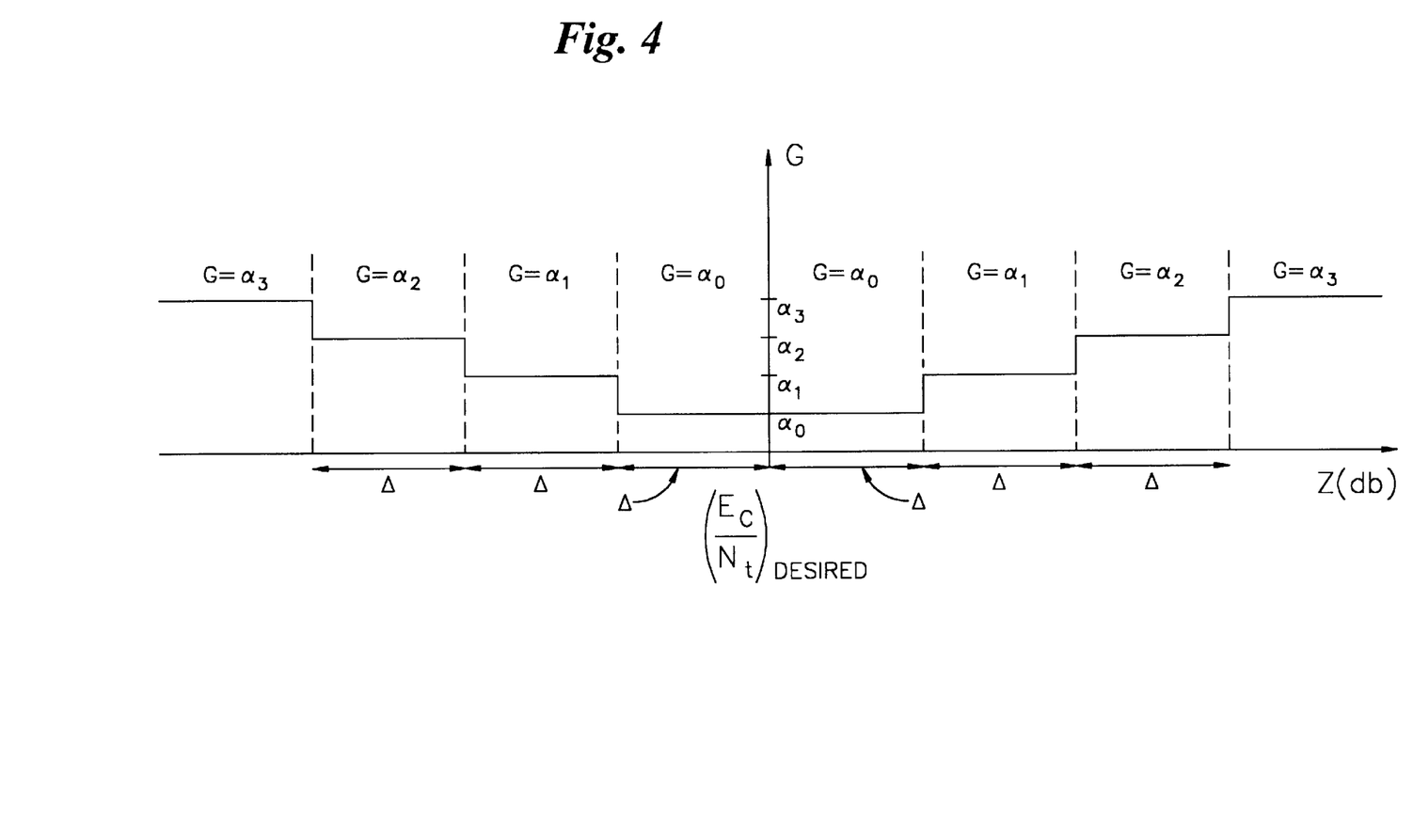
FIG. 4 is a diagram illustrating a method for selecting the gain to apply to power control signals, in accordance with a preferred embodiment of the disclosed method and apparatus.

FIG. 4 illustrates an exemplary method for selecting the variable gain value ($G_i$) to apply to the power control bits in step 160. In the example shown in FIG. 4, a first gain value ($\alpha_0$) is applied to the power control bit value ($PC_i$) when the magnitude of the signal strength estimate ($Z_i$) is within a predetermined amount ($\Delta$) of the threshold $(E_c/N_t)_{desired}$; a second gain value ($\alpha_1$) is applied to the power control bit value when the magnitude of the signal strength estimate ($Z_i$) is between $\Delta$ and $2*\Delta$ of the threshold $(E_c/N_t)_{desired}$; a third gain value ($\alpha_2$) is applied to the power control bit value when the magnitude of the signal strength estimate ($Z_i$) ) is between $2*\Delta$ and $3*\Delta$ of the threshold $(E_c/N_t)_{desired}$; and a fourth gain value ($\alpha_3$) is applied to the power control bit value when the magnitude of the signal strength estimate ($Z_i$) is greater than $3*\Delta$ away from the threshold $(E_c/N_t)_{desired}$. In the example shown in FIG. 4, the first gain value ($\alpha_0$) is less than the second gain value ($\alpha_1$) which is less than the third gain value ($\alpha_2$) which is less than the fourth gain value ($\alpha_3$). In one embodiment described more fully below, the first gain value ($\alpha_0$) may be set at a zero value, thereby resulting in an erasure of any power control bit having the first gain value ($\alpha_0$) applied thereto. An exemplary value for $\Delta$ in the function shown in FIG. 4 is 0.5 db, although this value is a matter of design choice and could be set at other levels. It will be understood by those skilled in the art that other functions besides that shown in FIG. 4 may be used for determining the variable gain values used by the disclosed method and apparatus. For example, a stepwise function similar to that shown in FIG. 4 could be employed where the thresholds used for determining which gain value to apply were not evenly or symmetrically spaced. Alternatively, a function could be used where the gain value was linearly or exponentially related to the difference between the signal strength estimate (Z) associated with the mobile unit and the threshold $(E_c/N_t)_{desired}$, so long as the gain function applied to the power control bit increased as the difference between the signal strength estimate (Z) associated with the mobile unit and the threshold $(E_c/N_t)_{desired}$ increased.

In step 170, one of a plurality of different orthogonal Walsh codes ($W_i$) is applied to each of the power control bits using Walsh cover unit 310. Each of the Walsh codes ($W_i$) is assigned to a particular mobile unit and uses a unique orthogonal spreading code for transmitting the power control bit associated with the particular mobile unit from the base station to the mobile unit associated with the Walsh codes ($W_i$). In step 180, the variable gain value ($G_i$) for each mobile unit determined in step 160 is applied (using amplifier 320) to the Walsh covered power control bits. Finally, in step 190, the Walsh covered and gain adjusted power control bits are encoded and simultaneously transmitted (as power control signal 330) from the base station to the mobile units serviced by the base station using spread spectrum modulation.

Figure 5:
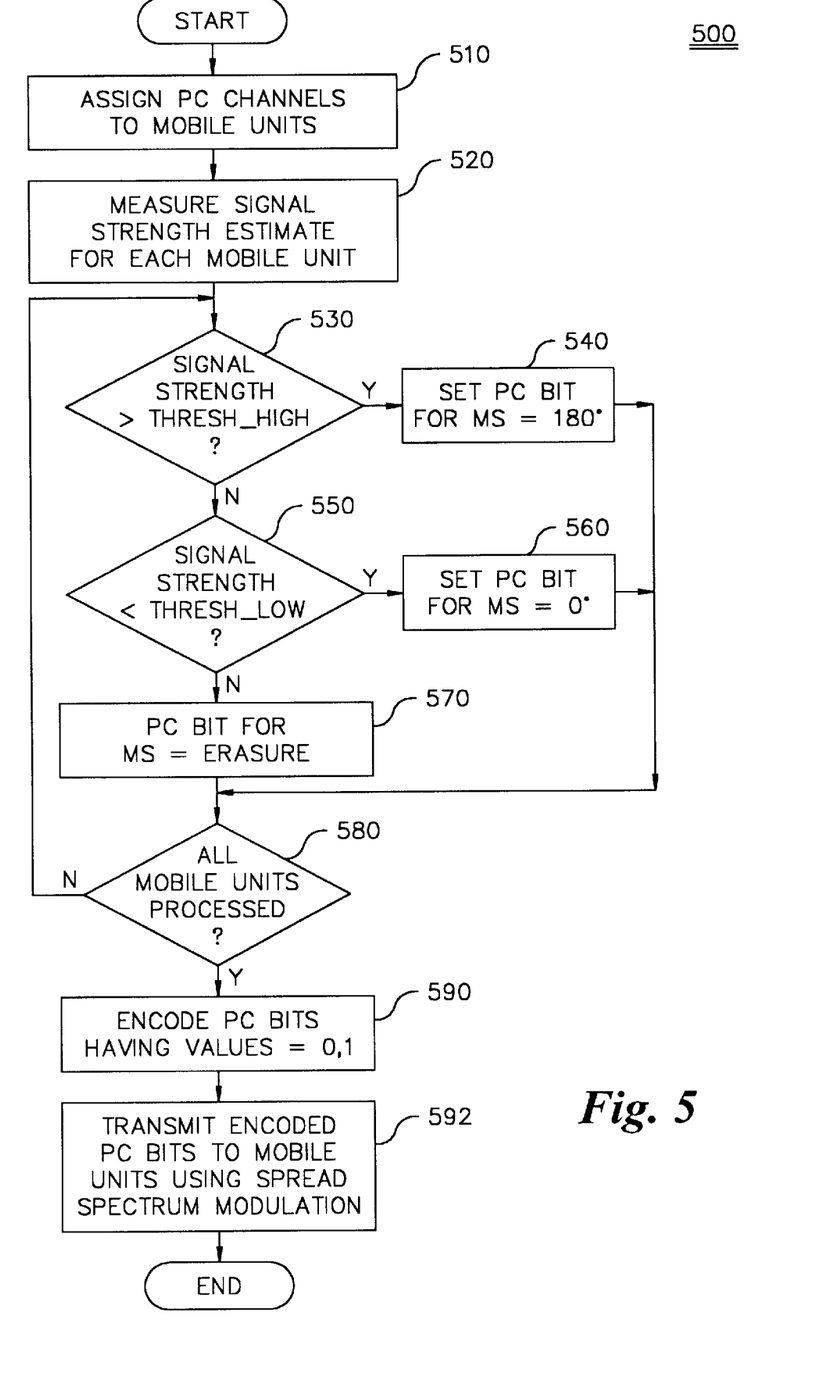
FIG. 5 is a flow diagram showing a method for determining and simultaneously transmitting power control bits to mobile units from a CDMA base station on a plurality of power control channels using a combination of on/off keying and BPSK modulation, in accordance with an alternative embodiment of the disclosed method and apparatus.

Referring now to FIG. 5, there is a flow diagram showing the operation of a method 500 for determining and simultaneously transmitting power control bits to mobile units from a CDMA base station on a plurality of power control channels using spread spectrum modulation, in accordance with an alternative preferred embodiment of the disclosed method and apparatus. Method 500 represents a specific implementation of method 200 described above. In step 510, a plurality of power control channels are allocated (either at the base station or a mobile switching station) for transmitting power control information from the base station to the mobile units being serviced by the base station. Each of the power control channels is assigned to a different one of the plurality of mobile units being serviced by the base station and uses one of a plurality of different orthogonal codes for transmitting power control information bits from the base station to a mobile unit using spread spectrum modulation.

In step 520, a signal strength estimate (e.g., the value (Z) described above and shown in FIG. 1) is measured at the base station for each of the mobile units being serviced by the base station. For each mobile unit, the signal strength estimate associated with the mobile unit is measured at the base station based on reverse link signals sent from the mobile unit and received at the base station. In a preferred embodiment, the signal strength estimate is measured for each particular mobile station ($MS_i$, where i=1 to the number of mobile stations serviced by the base station) by monitoring at the base station a pilot signal sent from the particular mobile station, and then detecting the signal strength value ($Z_i$) associated with that pilot signal. In step 530, the signal strength estimate ($Z_i$) associated with each mobile unit is compared to a high threshold. In one embodiment, the high threshold used in step 530 is set, for example, by adding a predetermined amount such as 0.5 db to $(E_c/N_t)_{desired}$. In step 540, if the signal strength estimate associated with a particular mobile unit is greater than the high threshold, then a power control bit having a first value (i.e., $PC_i=180°$) is assigned to the mobile unit. In this embodiment, a power control bit having the first value (i.e., $PC_i=180°$) corresponds to a command to a mobile unit that the mobile unit should decrease its output transmit power by a predetermined amount such as 1 db during its next transmit interval. If the signal strength estimate ($Z_i$) associated with the particular mobile unit was not greater than the high threshold, then in step 550, the signal strength estimate ($Z_i$) associated with the mobile unit is compared to a low threshold. In one embodiment, the low threshold used in step 550 is set for example, by subtracting a predetermined amount such as 0.5 db from $(E_c/N_t)_{desired}$. In step 560, if the signal strength estimate ($Z_i$) associated with a particular mobile unit is less than or equal to the low threshold, then a power control bit having a second value (i.e., $PC_i=0°$) is assigned to the mobile unit. In this embodiment, a power control bit having the second value (i.e., $PC_i=0°$) corresponds to a command to a mobile unit that the mobile unit should increase its output transmit power by a predetermined amount such as 1 db during the next transmit interval. If the signal strength estimate ($Z_i$) associated with a particular mobile station is less than the high threshold and more than the low threshold, then in step 570 a power control bit erasure is associated with the mobile unit. As described more fully below, when a power control bit erasure is associated with a particular mobile unit, no power control bit will be transmitted to the particular mobile station when the power control bits having the first and second values are transmitted to their associated mobile stations. In step 580, steps 530–570 are repeated for all mobile units serviced by the base station.

In steps 590 and 592, the power control bits having the first and second values (i.e., $PC_i=0°$, 180°) are encoded and simultaneously transmitted from the base station to the mobile units serviced by the base station using spread spectrum modulation. As mentioned above, in this embodiment, a plurality of power control channels are provided for transmitting the power control bits from the base station to the mobile units. Each of the power control channels is assigned to a particular mobile unit and uses a unique orthogonal spreading code for transmitting the power control bit associated with the particular mobile unit from the base station to the mobile unit associated with the power control channel. If the signal strength estimate ($Z_i$) associated with a particular mobile unit was determined in step 550 to be less than the high threshold and greater than the low threshold, then a power control bit erasure is associated with the power control channel assigned to the particular mobile unit. In step 592, each power control bit having the first and second values is simultaneously transmitted to the mobile units during a time interval on its associated power control channel using a power control signal structure such as that of signal 330 in FIG. 3. However, transmission of a power control bit is inhibited during the time interval on each power control channel having a power control bit erasure associated therewith. As a result of the inhibition of transmission (or erasure) of selected power control bits in step 592, fewer power control bits are transmitted from the base station in step 592, thereby permitting the base station to increase the transmit power allocated to each transmitted power control bit in this step. In the preferred embodiment of FIG. 5, each of the power control bits is also preferably modulated in step 592 in accordance with a combination of OOK (on-off keying) and BPSK modulation and can therefore assume three states, namely off, 0 degrees and 180 degrees. The second an third states (i.e. 0 and 180 degrees)

are used to convey power-up and power-down commands to the mobile station in response to which the mobile station will, for example, either raise its output transmit power by 1 dB (if a power-up command is received) or lower its output transmit power by 1 dB (if a power-down command is received). The first state (i.e., off) is used when there has been an erasure of a power control bit. In this embodiment, the power control bits transmitted in step 592 are sent simultaneously during a time interval that corresponds to 128 spreading chips.

Figure 6:
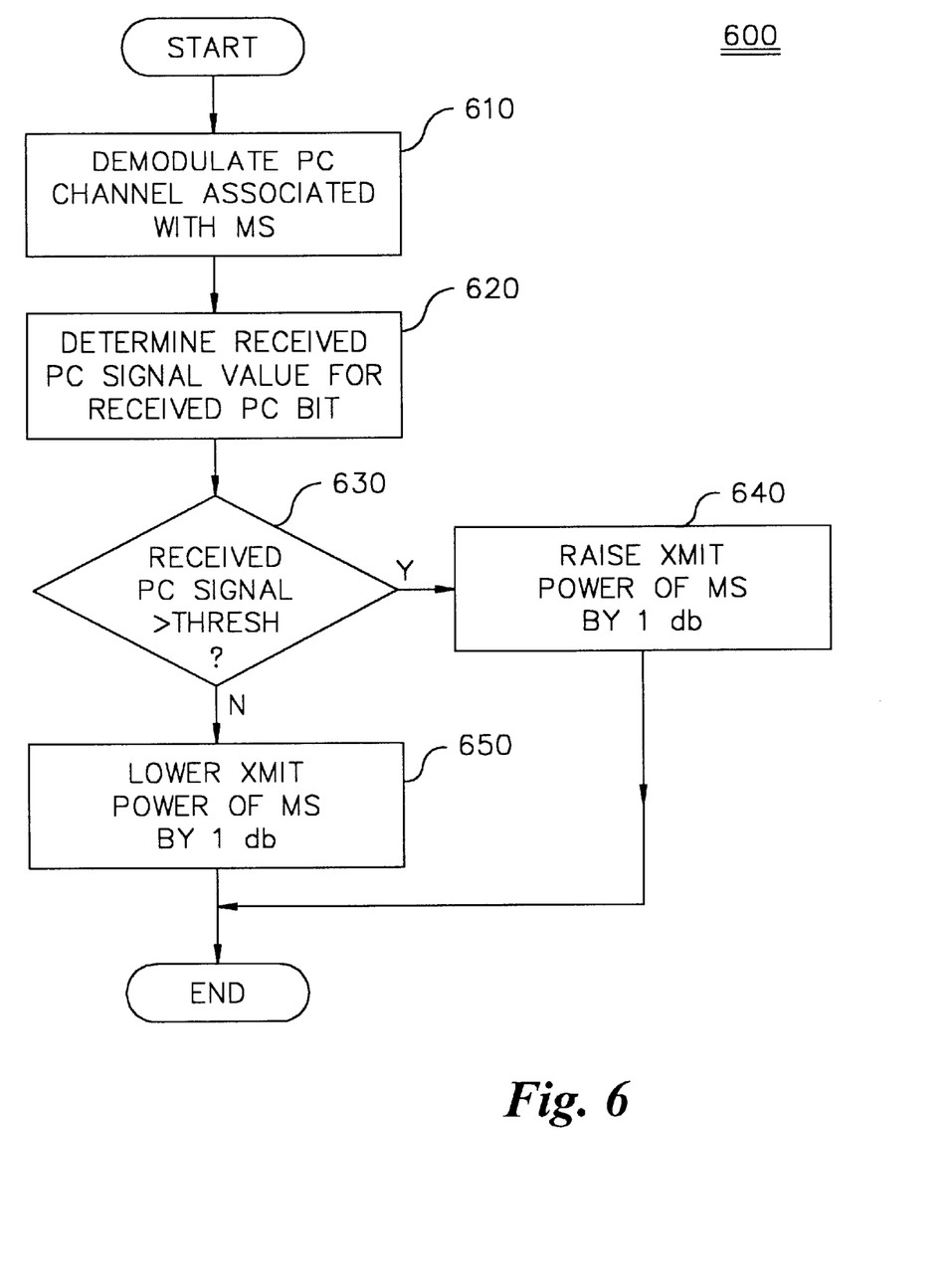
FIG. 6 is a flow diagram showing the operation of a system for interpreting power control information signals received at a mobile unit in order to control the output transmit power of the mobile station, in accordance with a preferred embodiment of the disclosed method and apparatus.

Referring now to FIG. 6, there is a flow diagram of a system 600 for interpreting power control information signals received at a mobile unit in order to control the output transmit power of the mobile station. In one embodiment of the disclosed method and apparatus, the system 200 (or 500) described above for transmitting power control bits from a base station may be combined with the binary system 200 at each of the mobile units for interpreting the power control information signals sent from a base station. In steps 610 and 620 of this system, a received power control signal value is determined at a mobile station by demodulating transmissions on the power control channel associated with the mobile station. Where spread spectrum modulation is used for simultaneously transmitting each power control bit to the mobile stations as described above, each mobile unit uses the orthogonal spreading code ($W_i$) associated with that mobile unit to demodulate the power control channel (and the power control bit) associated with the mobile unit to arrive at the received power control signal value of the signal transmitted to the mobile station. The received power control signal value will be a function of both the signal strength of the power control bit transmitted from the base station to the mobile station and the value (e.g., 0 degrees or 180 degrees) assigned to the power control bit that was transmitted. In step 630, the received power control signal value is compared to a threshold at the mobile station. Where the power control bit transmitted from the base station can be set at 0 degrees or 180 degrees, the threshold used in step 630 is preferably set at a zero value. If the received power control signal value is greater than the threshold, then in step 640 the transmit power of signals sent from the mobile unit to the base station on the reverse link is increased (by, e.g., 1 db) during the next transmit interval and, if the received power control bit value is less than the threshold, then in step 650 the transmit power of signals sent from the mobile unit to the base station on the reverse link is decreased (by, e.g., 1 db) during the next transmit interval.

For the reasons discussed above in the background section, when the transmit power control system 200 (or 500) is combined with the binary power control interpretation system 600 at a mobile station, the performance of the closed loop power control system will not be significantly affected by the reduced power allocated at the base station to those power control bits which had a significant probability of carrying an erroneous power control command. Although the mobile station will often err in determining the transmitted value of weakly transmitted power control commands received at the mobile station, these errors will not adversely affect the system performance because these weak signals conveyed information which itself was believed to be erroneous. In these cases, the "random" decision that the mobile station is in essence making when it attempts to decode the weakly transmitted power control command is believed to be statistically equivalent to the result that would otherwise be achieved if power control commands which conveyed information having a high probability of error were transmitted from the base station at full power and correctly decoded at the mobile station.

Figure 7:
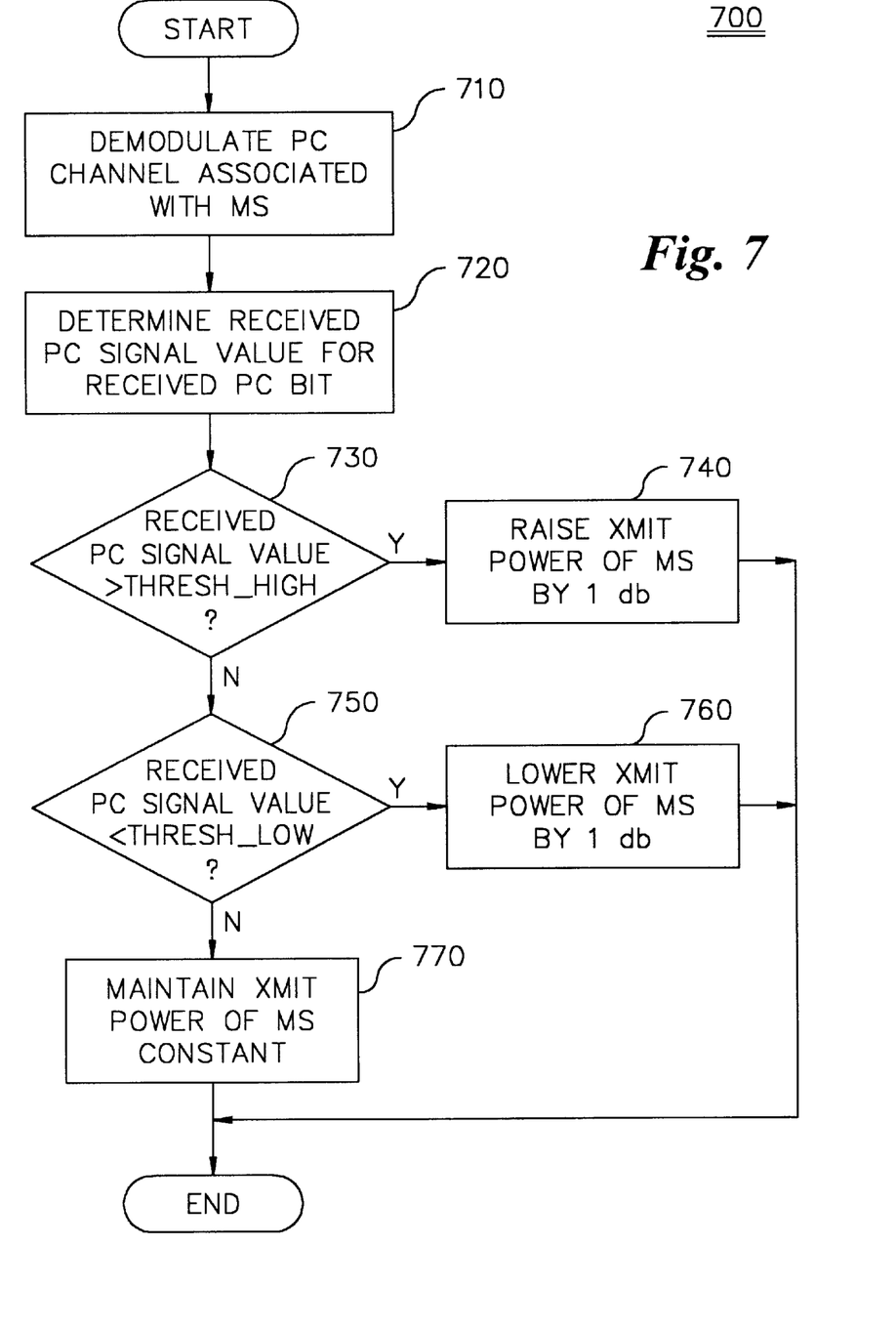
FIG. 7 is a flow diagram showing the operation of a system for interpreting power control information signals received at a mobile unit in order to control the output transmit power of the mobile station, in accordance with a still further embodiment of the disclosed method and apparatus.

Referring now to FIG. 7, there is a flow diagram of a system 700 for interpreting power control information signals received at a mobile unit in order to control the output transmit power of the mobile station, in accordance with a still further embodiment of the disclosed method and apparatus. In this embodiment, the system 200 (or 500) described above for transmitting power control bits from a base station may be combined with the ternary system 700 at each of the mobile units for interpreting the power control information signals sent from a base station. In steps 710 and 720 of this system, a received power control signal value is determined at a mobile station by demodulating transmissions on the power control channel associated with the mobile station. Steps 710 and 720 of this system are performed substantially in accordance with steps 610 and 620 described above. In steps 730 and 740, the received power control signal value is compared to high and low thresholds at the mobile station. If the received power control bit value is greater than the high threshold, then in step 740 the transmit power of signals sent from the mobile unit to the base station on the reverse link is increased (by, e.g., 1 db) during the next transmit interval and, if the received power control bit value is less than the low threshold, then in step 750 the transmit power of signals sent from the mobile unit to the base station on the reverse link is decreased (by, e.g., 1 db) during the next transmit interval. In step 770, if the received power control bit value is less than the high threshold and greater than the low threshold, then the transmit power of signals sent from the mobile unit to the base station on the reverse link is held constant during the next time interval.

Where the combination of OOK and BPSK modulation described above is used to transmit the power control information from the base station to the mobile units, the high and low thresholds used in system 700 are preferably set in a manner that optimally distinguishes each of the three possible states of the power control bit (i.e., off, 0 degrees and 180 degrees) transmitted from the base station. In a particularly preferred embodiment, these high and low thresholds are set by determining adding and subtracting a predetermined amount (e.g., 0.5 db) from a zero level. It will be understood by those skilled in the art that the values used for the high and low thresholds in system 700 are a matter of design choice and may, for example, be selected so as to accurately recognize the expected number of power control bit erasures made at the base station.

It will be understood by those skilled in the art that, by making the high and low thresholds in system 700 equal to each other, system 700 can be made to function virtually identically to that of system 600. In a further embodiment of the disclosed method and apparatus, system 700 may be operated initially in a state where the high and low thresholds used in steps 730 and 750 are initially both set equal to the same value (e.g., a zero value), and thereafter the high and low thresholds are gradually moved apart from this value in a symmetric manner in order to allow the mobile unit to begin to distinguish weakly power control transmitted signals and erasures made at the base station from power control signals transmitted with greater power.

Figure 8:
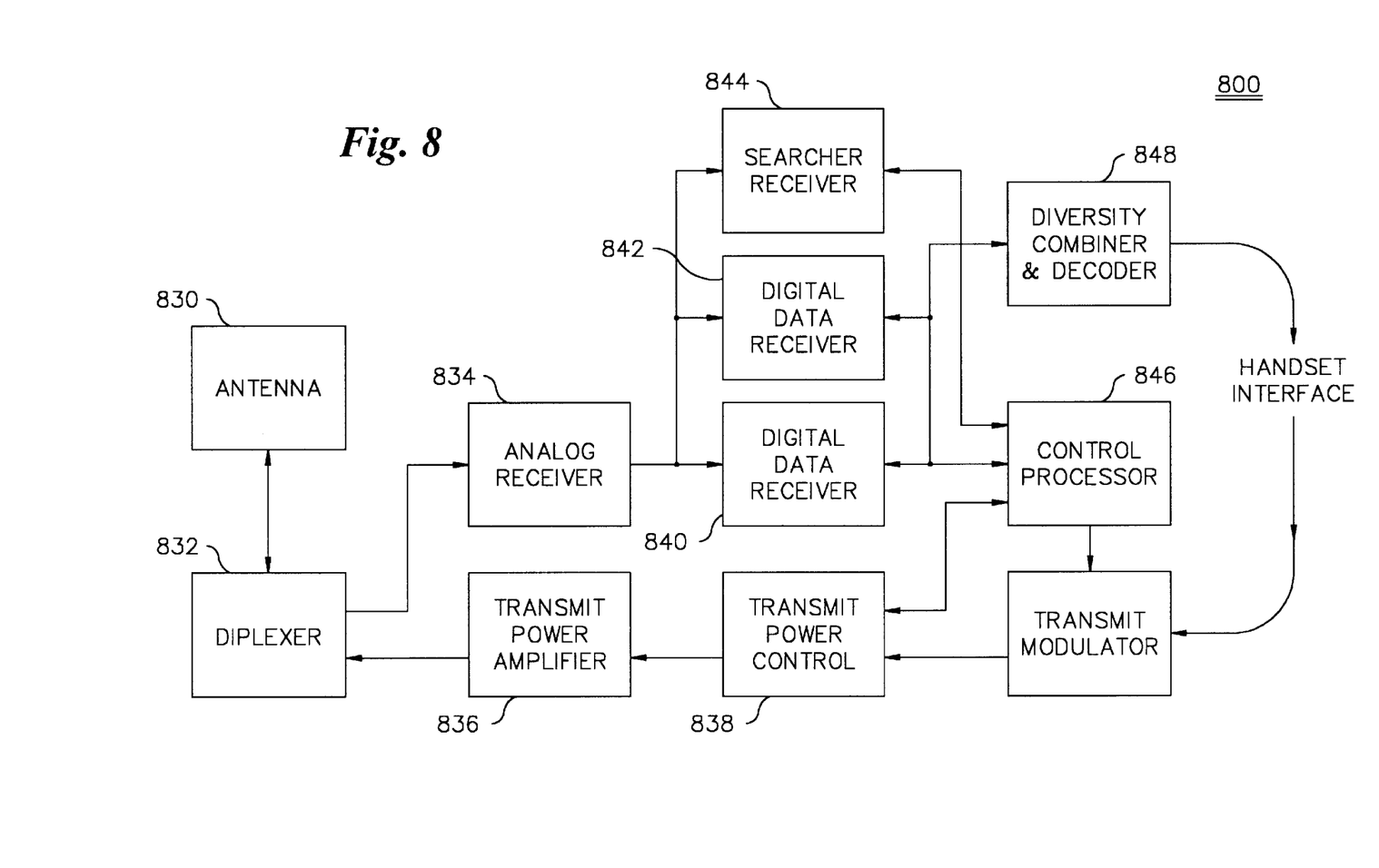
FIG. 8 is a block diagram of showing the components of an exemplary mobile station used for implementing the power control system of the disclosed method and apparatus.

Referring now to FIG. 8, there is a block diagram showing the components of an exemplary mobile station 800 used for implementing the reverse link power control systems of the disclosed method and apparatus. The mobile station includes an antenna 830 which is coupled through diplexer 832 to analog receiver 834 and transmit power amplifier 836. Antenna 830 and diplexer 832 are of standard design and permit simultaneous reception and transmission through a single antenna. Antenna 830 collects signals transmitted to the mobile station from one or more base stations and provides the signals though diplexer 832 to analog receiver 834. Receiver 834 is also provided with an analog to digital converter (not shown). Receiver 834 receives RF signals from diplexer 832, amplifies and frequency downconverts the signals, and provides a digitized output signal to digital data receivers 840, 842 and to search receiver 844. It will be understood that, although in the embodiment in FIG. 8 only two digital data receivers are shown, a low performance mobile station might have only a single digital data receiver while higher performance units will have two or more digital data receivers to permit diversity reception. The outputs of receivers 840 and 842 are provided to diversity and combiner circuitry 848 which time adjusts the two streams of data received from the receivers 840 and 842, adds the streams together and decodes the result. Details concerning the operation of the digital data receivers 840, 842, the search receiver 844, and the diversity combiner and decoder circuitry 848 are described in U.S. Pat. No. 5,101,501 entitled "Method and Apparatus for Providing A Soft Handoff In Communications In A CDMA Cellular Telephone System", which is assigned to the assignee of the present invention and incorporated herein by reference.

An output signal is provided from the decoder 848 to control processor 846. In response to this output signal, the control processor 846 determines the power control signal values provided to the mobile station from the base station as described above. The control processor 846 uses the received power control signal values in accordance with the disclosed method and apparatus (as described above in connection with FIGS. 6 and 7 which are preferably implemented in software on control processor 846) in order to determine whether the mobile station should either power-up, power-down or maintain its output transmit power. In response to this determination, control processor 846 sends signals to the transmit power controller 838 commanding controller 838 to, for example, either increase or decrease the output power level of the transmit amplifier 836 by either plus or minus 1 db.

Figure 9:
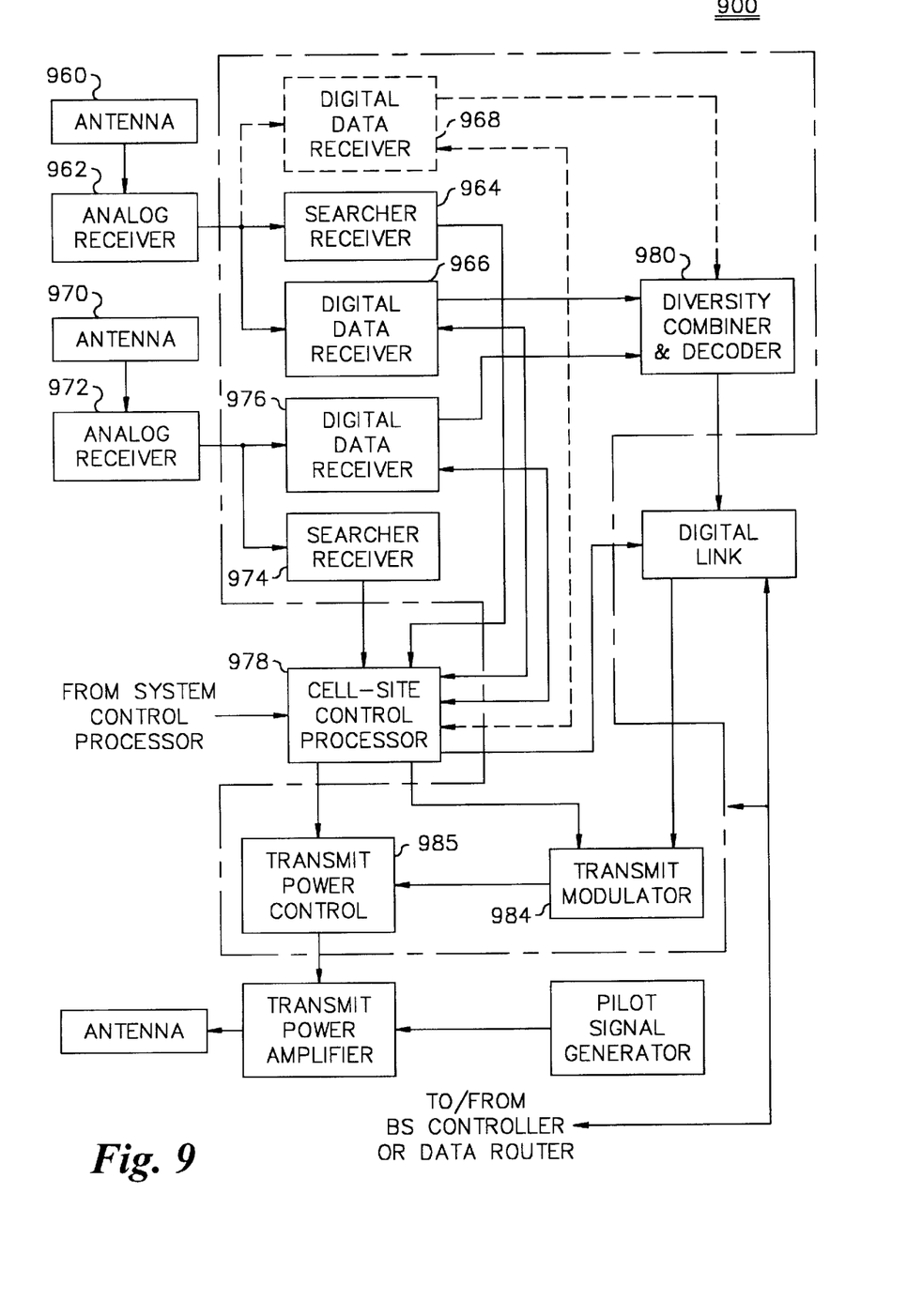
FIG. 9 is a block diagram of showing the components of an exemplary base station used for implementing the power control system of the disclosed method and apparatus.

Referring now to FIG. 9, there is shown a block diagram of the components of an exemplary base station 900 used for implementing the reverse link power control system of the disclosed method and apparatus. At the base station, two receiver systems are utilized with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 9, the first receiver system is comprised of antenna 960, analog receiver 962, searcher receiver 964 and digital data receivers 966 and 968. The second receiver system includes antenna 970, analog receiver 972, searcher receiver 974 and digital data receiver 976. Cell-site control processor 978 is used for signal processing and control. The methods shown in FIG. 2 and 5 are preferably implemented in software using control processor 978, transmit modulator 984 and transmit power controller 985 . Both receiver systems are coupled to diversity combiner and decoder circuitry 980. A digital link 982 is used to communicate signals from and to a base station controller or data router under the control of control processor 978.

Signals received on antenna 960 are provided to analog receiver 962, where the signals are amplified, frequency translated and digitized in a process identical to that described in connection with the mobile station analog receiver. The output from the analog receiver 962 is provided to digital data receivers 966 and 968 and searcher receiver 964. The second receiver system (i.e., analog receiver 972, searcher receiver 974 and digital data receiver 976) process the received signals in a manner similar to the first receiver system. The outputs of the digital data receivers 966, 976 are provided to diversity combiner and decoder circuitry 980, which processes the signals in accordance with a decoding algorithm. Details concerning the operation of the first and second receiver systems and the diversity combiner and decoder 980 are described in U.S. Pat. No. 5,101,501 entitled "Method and Apparatus for Providing A Soft Handoff In Communications In A CDMA Cellular Telephone System", incorporated above. Signals for transmission to mobile units are provided to a transmit modulator 984 under the control of processor 978. Transmit modulator 984 modulates the data for transmission to the intended recipient mobile station. Among other things, the data signals output from the transmit modulator 984 will include the power control information bits that are the subject of the disclosed method and apparatus.

The previous description of the preferred embodiments is provided to enable any person skilled in the art to make or use the present invention. Although the present invention has been described in conjunction with the transmission of power control commands from a base station to a mobile station in a mobile radio communication system, the principles of the present invention may be applied in other contexts and applications. Thus, the principles of the present invention may be used to reduce the transmit power of any type of information signal in cases where there is a probability that the information signal is in fact conveying erroneous information. Various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method for controlling the transmit power allocated to an information signal transmitted from a first site within a communication system, the method comprising the steps of:

(A) assessing a probability that the information signal contains erroneous information prior to transmission of the information signal from the first site;

(B) applying a variable gain to the information signal in accordance with the probability that the information signal contains erroneous information, wherein the variable gain applied to the information signal decreases as the probability that the information signal contains erroneous information increases; and (C) after step (B), transmitting the information signal from the first site.

2. The method of claim 1, wherein step (B) further comprises selecting a value of the variable gain from a set of candidate variable gain values, the set of candidate variable gain values including at least two different non-zero candidate variable gain values.

3. The method of claim 2, wherein the set of candidate variable gain values includes a zero gain value that corresponds to an erasure of the information signal.

4. The method of claim 1, wherein the first site is a base station in a mobile radio communication system having a plurality of mobile units and the information signal is a power control bit transmitted from the base station for controlling the reverse link transmit power of a mobile unit.

5. The method of claim 4, wherein the step of assessing a probability further comprises the steps of:
  (A) measuring, at the base station, at least one signal strength estimate associated with each of the mobile unit, each measurement based on reverse link signals sent from the associated mobile unit and received at the base station and comparing the signal strength estimate associated with each mobile unit to a threshold;
  and wherein the step of applying the variable gain further comprises the steps of:
  (B) for each mobile unit in the plurality of mobile units:
    (i) assigning a power control bit having a first value to the mobile unit and applying a variable gain to the power control bit if the signal strength estimate associated with the mobile unit is greater than the threshold; and
    (ii) assigning a power control bit having a second value to the mobile unit and applying a variable gain to the power control bit if the signal strength estimate associated with the mobile unit is less than the threshold;
    (iii) wherein the variable gain applied in steps (i) and (ii) to each power control bit is a function of a difference between the signal strength estimate associated with the mobile unit and the threshold, and wherein the variable gain applied to the power control bit in steps (i) and (ii) increases as the difference between the signal strength estimate associated with the mobile unit and the threshold increases; and
  (C) wherein the step of transmitting the information signal further comprises transmitting each power control bit to the mobile units.

6. The method of claim 5, wherein the variable gain applied in steps (i) and (ii) to each power control bit corresponds to a first gain value when a magnitude of the difference between the signal strength estimate associated with the mobile unit and the threshold is less than a first positive amount, and the variable gain applied in steps (i) and (ii) to each power control bit corresponds to a second gain value when the magnitude of the difference between the signal strength estimate associated with the mobile unit and the threshold is more than the first positive amount.

7. The method of claim 6, wherein the first gain value corresponds to an erasure and the second gain value corresponds to a positive gain.

8. The method of claim 6, wherein the variable gain applied in steps (i) and (ii) to each power control bit corresponds to a third gain value when the magnitude of the difference between the signal strength estimate associated with the mobile unit and the threshold is greater than the first positive amount and less than a second positive amount, the second positive amount being greater than the first positive amount.

9. The method of claim 5, further comprising the step of providing a plurality of power control channels for transmitting power control information from the base station to the mobile units, each of the power control channels being assigned to one of the plurality of mobile units and using one of a plurality of different orthogonal codes for transmitting the power control bits from the base station to a mobile unit in step (C).

10. The method of claim 9, wherein step (C) comprises simultaneously transmitting each power control bit to the mobile units during a time interval, wherein each power control bit is transmitted to the mobile units on a different one of the plurality of power control channels.

11. The method of claim 10, wherein transmission from said base station of said first value of said power control bit on a first power control channel represents a command to a first mobile unit to increase the transmit power of signals sent from the first mobile unit to the base station on the reverse link, and transmission from said base station of said second value of said power control bit on a second power control channel represents a command to a second mobile unit to decrease the transmit power of signals sent from the second mobile unit to the base station on the reverse link.

12. The method of claim 5, wherein steps (A)–(C) are performed repeatedly during successive time slots for each of the plurality of mobile units.

13. The method of claim 5, wherein step (A) further comprises, for each of the mobile units, measuring at the base station, a signal strength estimate based on pilot signals sent from the mobile units and received at the base station, wherein each signal strength estimate is associated with one of the mobile units.

14. The method of claim 5, further comprising the steps of:
  (A) determining a received power control signal value at a mobile station by demodulating transmissions on the power control channel associated with the mobile station;
  (B) comparing the received power control signal value to second and third thresholds at the mobile station;
  (C) if the received power control bit value is greater than the second threshold, then increasing the transmit power of signals sent from the mobile unit to the base station on the reverse link; and
  (D) if the received power control bit value is less than the third threshold, then decreasing the transmit power of signals sent from the mobile unit to the base station on the reverse link.

15. The method of claim 14, wherein the second threshold is equal to the third threshold.

16. The method of claim 14, wherein the second threshold is greater than the third threshold.

17. The method of claim 16, further comprising the step of:
  (A) if the received power control signal value is less than the second threshold and greater than the third threshold, then holding constant the transmit power of signals sent from the mobile unit to the base station on the reverse link.

18. The method of claim 1, wherein the first site is a base station in a mobile radio communication system having a plurality of mobile units, the second site is one of the plurality of mobile units, and step (A) further comprises the steps of:
  (A) for each of the mobile units, measuring at the base station, a signal strength estimate based on reverse link signals sent from the mobile units and received at the base station, wherein each signal strength estimate is associated with one of the mobile units, and comparing the signal strength estimate associated with each mobile unit to a high threshold and a low threshold;
  step (B) further comprises the steps of:
  (B) for each mobile unit in the plurality of mobile units:
    (i) if the signal strength estimate associated with the mobile unit is greater than the high threshold, then assigning a power control bit having a first value to the mobile unit; and (ii) if the signal strength estimate associated with the mobile unit is less than the low threshold, then assigning a power control bit having a second value to the mobile unit; and (iii) if the signal strength estimate associated with the mobile unit is less than the high threshold and greater than the low threshold, then associating a power control bit erasure with the mobile unit; and step (C) further comprises:

(C) transmitting each power control bit having the first and second value to the mobile units, wherein transmission of a power control bit is inhibited for each mobile unit having a power control bit erasure associated therewith.

19. The method of claim 18, further comprising the step of providing a plurality of power control channels for transmitting power control information from the base station to the mobile units, each of the power control channels being assigned to one of the plurality of mobile units and using one of a plurality of different orthogonal codes for transmitting power control information from the base station to a mobile unit, wherein step (B)(iii) comprises the step of:

(iii) if the signal strength estimate associated with the mobile unit is less than the high threshold and greater than the low threshold, then associating a power control bit erasure with the power control channel assigned to the mobile unit.

20. The method of claim 19, wherein step (C) further comprises simultaneously transmitting each power control bit having the first and second value to the mobile units during a time interval, wherein each power control bit having the first value or the second value is transmitted to the mobile units on a different one of the plurality of power control channels, and wherein transmission of a power control bit is inhibited during the time interval for each power control channel having a power control bit erasure associated therewith.

21. The method of claim 20, wherein transmission from said base station of said first value of said power control bit on a first power control channel represents a command to a first mobile unit to increase the transmit power of signals sent from the first mobile unit to the base station on the reverse link, and transmission from said base station of said second value of said power control bit on a second power control channel represents a command to a second mobile unit to decrease the transmit power of signals sent from the second mobile unit to the base station on the reverse link.

22. The method of claim 21, wherein steps (A)–(C) are performed repeatedly during successive time slots for each of the plurality of mobile units.

23. The method of claim 18, wherein step (A) comprises:

(A) for each of the mobile units, measuring at the base station, a signal strength estimate based on pilot signals sent from the mobile units and received at the base station, wherein each signal strength estimate is associated with one of the mobile units.

24. The method of claim 18, wherein the power control bits transmitted in step (C) are transmitted using BPSK modulation.

25. The method of claim 18, further comprising the steps of setting the high threshold above a desired signal strength value and setting the low threshold below the desired signal strength value.

26. The method of claim 25, wherein the high threshold is set k db above the desired signal strength value and the low threshold is set k db below the desired signal strength value.

27. The method of claim 20, further comprising the steps of:

(A) determining a received power control signal value at a mobile station by demodulating transmissions on the power control channel associated with the mobile station;

(B) comparing the received power control signal value to third and fourth thresholds at the mobile station;

(C) if the received power control bit value is greater than the third threshold, then increasing the transmit power of signals sent from the mobile unit to the base station on the reverse link; and (D) if the received power control bit value is less than the fourth threshold, then decreasing the transmit power of signals sent from the mobile unit to the base station on the reverse link.

28. The method of claim 27, wherein the third threshold is equal to the fourth threshold.

29. The method of claim 27, wherein the third threshold is greater than the fourth threshold.

30. The method of claim 29, further comprising the step of:

(A) if the received power control bit value is less than the third threshold and greater than the fourth threshold, then holding constant the transmit power of signals sent from the mobile unit to the base station on the reverse link.

31. In a communication system having a first site that transmits an information signal to a second site, an apparatus for controlling the transmit power allocated to the information signal at the first site, comprising:

(A) a controller that assesses a probability that the information signal contains erroneous information prior to transmission of the information signal from the first site to the second site;

(B) an amplifier that applies a variable gain to the information signal in accordance with the probability that the information signal contains erroneous information, wherein the variable gain applied to the information signal decreases as the probability that the information signal contains erroneous information increases;

(C) a transmitter that transmits the information signal from the first site to the second site.

32. The apparatus of claim 31, wherein the controller selects a value of the variable gain from a set of candidate variable gain values, the set of candidate variable gain values including at least two different non-zero candidate variable gain values.

33. The apparatus of claim 32, wherein the set of candidate variable gain values includes a zero gain value that corresponds to an erasure of the information signal.

34. The apparatus of claim 31, wherein the first site is a base station in a mobile radio communication system having a plurality of mobile units, the second site is one of the plurality of mobile units, and the information signal is a power control bit transmitted from the base station for controlling the reverse link transmit power of a mobile unit.

35. The apparatus of claim 34, wherein the controller calculates, for each of the mobile units, a signal strength estimate based on reverse link signals sent from the mobile units and received at the base station, wherein each signal strength estimate is associated with one of the mobile units; the controller compares the signal strength estimate associated with each mobile unit to a threshold; and, for each mobile unit in the plurality of mobile units, the controller assigns a power control bit having a first value to the mobile unit if the signal strength estimate associated with the mobile unit is greater than the threshold, and the controller assigns a power control bit having a second value to the mobile unit if the signal strength estimate associated with the mobile unit is less than the threshold;

wherein the amplifier applies the variable gain to each power control bit, the variable gain applied by the amplifier to each power control bit being a function of a difference between the signal strength estimate associated with the mobile unit and the threshold such that the variable gain applied by the amplifier to each power control bit increases as the difference between the signal strength estimate associated with the mobile unit and the threshold increases;

and wherein the transmitter transmits each power control bit to the mobile units.

36. The apparatus of claim 35, wherein the transmitter transmits the power control bits on a plurality of power control channels, each of the power control channels being assigned to one of the plurality of mobile units and using one of a plurality of different orthogonal codes for transmitting power control information from the base station to a mobile unit.

37. The apparatus of claim 36, wherein the transmitter simultaneously transmits each power control bit to the mobile units during a time interval such that each power control bit is transmitted to the mobile units on a different one of the plurality of power control channels.

38. In a communication system having a first site that transmits an information signal to a second site, an apparatus for controlling the transmit power allocated to the information signal at the first site, comprising:

(A) means for assessing a probability that the information signal contains erroneous information prior to transmission of the information signal from the first site to the second site;

(B) means for applying a variable gain to the information signal in accordance with the probability that the information signal contains erroneous information, wherein the variable gain applied to the information signal decreases as the probability that the information signal contains erroneous information increases;

(C) means for transmitting the information signal from the first site to the second site.

39. The apparatus of claim 38, wherein the means for assessing selects a value of the variable gain from a set of candidate variable gain values, the set of candidate variable gain values including at least two different non-zero candidate variable gain values.

40. The apparatus of claim 39, wherein the set of candidate variable gain values includes a zero gain value that corresponds to an erasure of the information signal.

41. The apparatus of claim 38, wherein the first site is a base station in a mobile radio communication system having a plurality of mobile units, the second site is one of the plurality of mobile units, and the information signal is a power control bit transmitted from the base station for controlling the reverse link transmit power of a mobile unit.

42. The apparatus of claim 41, wherein the means for assessing comprises means for measuring, for each of the mobile units, a signal strength estimate based on reverse link signals sent from the mobile units and received at the base station, wherein each signal strength estimate is associated with one of the mobile units; and means for comparing the signal strength estimate associated with each mobile unit to a threshold;

the apparatus further comprising means for assigning a power control bit having a first value to each mobile unit having an associated signal strength estimate that is greater than the threshold, and means for assigning a power control bit having a second value to each mobile unit having an associated signal strength estimate that is less than the threshold;

wherein the variable gain applied to each power control bit by the means for applying is a function of a difference between the signal strength estimate associated with the mobile unit and the threshold, and wherein the variable gain applied to each power control bit increases as the difference between the signal strength estimate associated with the mobile unit and the threshold increases; and wherein the means for transmitting transmits each power control bit to the mobile units.

43. The apparatus of claim 42, wherein the means for transmitting transmits the power control bits on a plurality of power control channels, each of the power control channels being assigned to one of the plurality of mobile units and using one of a plurality of different orthogonal codes for transmitting power control information from the base station to a mobile unit.

44. The apparatus of claim 43, wherein the means for transmitting simultaneously transmits each power control bit to the mobile units during a time interval such that each power control bit is transmitted to the mobile units on a different one of the plurality of power control channels.

* * * * *